(No Model.)
N. L. BROWN.
Drag Saw.
No. 231,474.        Patented Aug. 24, 1880.
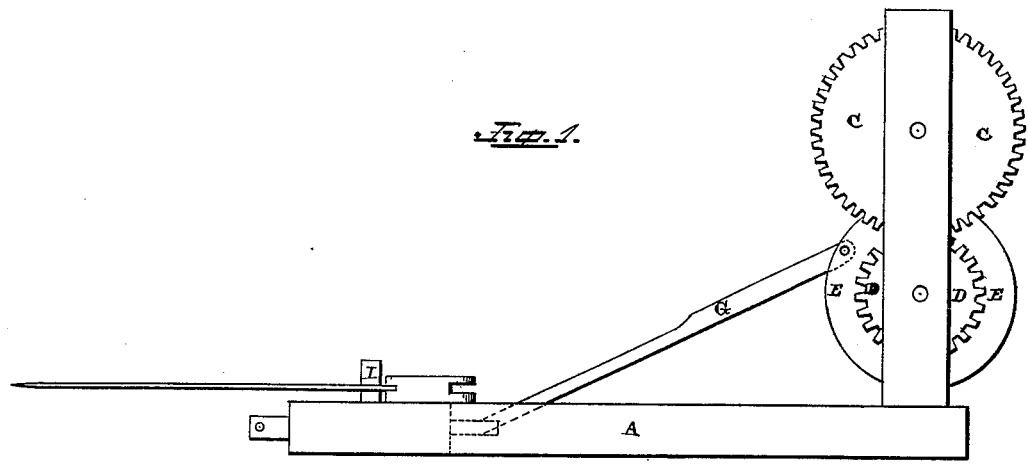
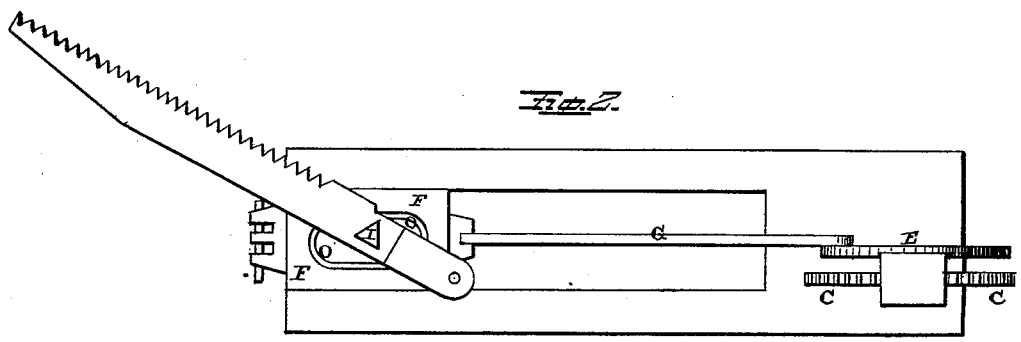
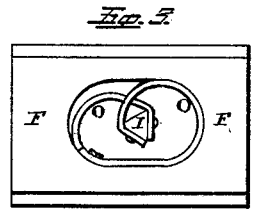
Witnesses:
W. W. Mortimer
Chas. H. Isham
Inventor:
N. L. Brown,
per
F. A. Lehmann,
Atty.

UNITED STATES PATENT OFFICE.

NATHAN L. BROWN, OF BROWNSDALE, PENNSYLVANIA.

DRAG-SAW.

SPECIFICATION forming part of Letters Patent No. 231,474, dated August 24, 1880.

Application filed June 29, 1880. (No model.)

*To all whom it may concern:*

Be it known that I, NATHAN L. BROWN, of Brownsdale, in the county of Butler and State of Pennsylvania, have invented certain new and useful Improvements in Drag - Sawing Machines; and I do hereby declare the following to be a full, clear, and exact description of the invention, such as will enable others skilled in the art to which it pertains to make and use it, reference being had to the accompanying drawings, which form part of this specification.

My invention relates to an improvement in drag-saws; and it consists in placing in the driving-head a short rod or shaft which has two coiled springs secured to it, and which impart their pressure in opposite directions, the said shaft having its upper end passed through the inner end of the saw, whereby the springs are made to press the saw alternately against opposite sides of the tree which is to be felled, so that the saw can be made to cut first on one side, then the other, as will be more fully described hereinafter.

The object of my invention is to enable the tree to be sawed down, and to operate the saw alternately on opposite sides, so that after the tree has been partially sawed through on one side the saw can be applied to the opposite side, and thus be out of the way when the tree falls.

Figure 1 is a side elevation of my invention. Fig. 2 is a plan view of the same. Fig. 3 is a detached view of the springs.

A represents a suitable frame, which may either rest solidly upon the ground or be provided with wheels for the purpose of transporting it from place to place, as may be desired. Upon one end of this frame is secured a suitable frame-work, and in this frame is journaled a large gear-wheel, C, which meshes with a pinion, D.

The shaft upon which the pinion D is placed has a balance-wheel, E, secured to one of its ends, and this balance-wheel is provided with a wrist-pin for the purpose of operating the driving-head F through the connecting-rod G.

Where logs or other lumber are to be cut in two the drag-saw is pivoted to the front end of this driving-head, and thus used in the usual manner. Where, however, the saw is to be used in felling trees, it is detached from the front end of the driving-head and is applied to the angular rod I, which extends up through an opening that is made through the driving - head. This saw has a hole corresponding to the shape of the angular rod made through its shank or block on its end, so that the saw can be applied to the rod in the manner shown.

Secured to the inside of this driving-head are two coiled springs, O, which have their outer ends rigidly secured to opposite sides of the opening which is made through the head, and have their inner ends fastened to opposite sides of the rod, so as to exert their power upon it from opposite directions.

When the rod is turned in either direction one of the springs is being coiled and the other spring uncoiled. These springs serve to force the saw against the side of the tree which has been felled, and serve to constantly feed the saw forward as fast as it cuts.

In sawing down a tree the frame A is placed upon one side, and then the saw is applied to the upper end of the spring-rod, so as to extend at about right angles to the frame, and then the saw is bent around past the end of the frame, so as to bear against the side of the tree. The operating mechanism is then put in motion, and the saw is reciprocated back and forth against the tree until the tree has been cut about three-eighths through. The saw is then removed from the rod and again applied to it so as to extend in the opposite direction in a line with the position it first assumed. The saw is again moved around so as to bear against the opposite side of the tree from that which has before been sawed, and the machine is again set in motion and the tree is sawed until it falls.

Where an attempt is made to saw a tree from one side only the tree falls over upon the saw and either breaks it off or spoils the set of the teeth, so that the saw is unfitted for further use until it has been repaired. By using the saw alternately upon opposite sides of the tree and sawing it about three-quarters through on one side the tree falls without any danger to the saw.

Having thus described my invention, I claim—

In a sawing-machine, the combination of the driving-head F, having an opening or recess made in its center, the angular pivot I, and the two springs O, the ends of the springs being secured to opposite sides of the pivot, whereby the teeth of the saw can be pressed against opposite sides of the tree, substantially as described.

In testimony that I claim the foregoing I have hereunto set my hand this 20th day of June, 1880.

NATHAN L. BROWN.

Witnesses:
 JOSEPH BROWN,
 A. H. STARR.